US010312765B2

(12) United States Patent
Winterer (10) Patent No.: US 10,312,765 B2
(45) Date of Patent: Jun. 4, 2019

(54) ELECTROMECHANICAL DRIVE DEVICE WITH HOUSING (71) Applicant: Dr. Fritz Faulhaber GmbH & Co. KG, Schönaich (DE)

(72) Inventor: Mario Winterer, Leinfelden-Echterdingen (DE)

(73) Assignee: Dr. Fritz Faulhaber GmbH & Co. KG, Schönaich (DE)

( * ) Notice: Subject to any disclaimer, the term of this patent is extended or adjusted under 35 U.S.C. 154(b) by 473 days.

(21) Appl. No.: 14/788,095

(22) Filed: Jun. 30, 2015

(65) Prior Publication Data
US 2016/0006315 A1 Jan. 7, 2016

(30) Foreign Application Priority Data

Jul. 3, 2014 (DE) .................. 10 2014 109 322

(51) Int. Cl.
*H02K 5/04* (2006.01)
*H02K 5/18* (2006.01)
*H02K 5/10* (2006.01)
*H02K 7/06* (2006.01)
*H02K 9/22* (2006.01)
(Continued)

(52) U.S. Cl.
CPC ............. *H02K 5/04* (2013.01); *H02K 5/10* (2013.01); *H02K 5/18* (2013.01); *H02K 7/06* (2013.01); *H02K 9/22* (2013.01); *H02K 11/0094* (2013.01); *H02K 11/33* (2016.01)

(58) Field of Classification Search
CPC .. H02K 5/04; H02K 5/06; H02K 5/15; H02K 5/18; H02K 5/20; H02K 5/22; H02K 9/22

USPC ............................................. 310/89, 91, 64
See application file for complete search history.

(56) References Cited

U.S. PATENT DOCUMENTS 4,712,030 A 12/1987 Lakin et al.
4,988,905 A * 1/1991 Tolmie, Jr. ............. H02K 29/06
310/68 B
(Continued)

FOREIGN PATENT DOCUMENTS

DE 24 32 178 1/1976
DE 41 22 529 A1 1/1993
(Continued)

OTHER PUBLICATIONS

German Examination Report—dated May 21, 2015.
EP 15 17 4202 European Search Report dated Feb. 24, 2016 and Written Opinion dated Mar. 6, 2016.

*Primary Examiner* — Bernard Rojas
(74) *Attorney, Agent, or Firm* — Brinks Gilson & Lione (57) ABSTRACT

An electromechanical drive device having a housing (1) and an electric drive part (1a) having a stator part (3) and a rotor part (4). The drive part (1a) is held circumferentially in the housing in a force-fitting manner, and the housing (1) is formed by a base part (6) having a bottom section (7) and two mutually opposing lateral wall sections (8) formed thereon on its longitudinal edges, and a housing opening formed by the lateral wall sections (8) at the end side. The housing opening (9) is closed by a housing cover (11) which in the mounted state is connected to the lateral wall sections (8) in a force and form fitting manner, wherein the force-fitting between the drive part (1a) and the housing (1) is present due to a bending of the lateral wall sections (8) toward each other.

21 Claims, 7 Drawing Sheets

(51) Int. Cl.
*H02K 11/00* (2016.01)
*H02K 11/33* (2016.01)

(56) References Cited

U.S. PATENT DOCUMENTS

| | | | |
|---|---|---|---|
| 5,714,816 A * | 2/1998 | Jensen | H02K 11/33 |
| | | | 310/64 |
| 6,274,957 B1 * | 8/2001 | Mahn | H02K 3/38 |
| | | | 29/596 |
| 6,437,469 B1 | 8/2002 | Davis et al. | |
| 6,528,911 B1 * | 3/2003 | De Petris | H01H 37/761 |
| | | | 257/E23.08 |

FOREIGN PATENT DOCUMENTS

| | | | |
|---|---|---|---|
| DE | 101 02 516 A1 | 1/2002 | |
| DE | 101 63 807 A1 | 7/2003 | |
| DE | 10 2008 015 686 A1 | 10/2008 | |
| DE | 10 2008 019582 A1 | 10/2009 | |
| DE | 10 2011 082 461 A1 | 12/2012 | |
| EP | 0048213 A1 * | 3/1982 | ............. H02K 5/18 |
| EP | 1 797 286 B1 | 9/2005 | |
| JP | 2011 078244 A | 4/2011 | |

* cited by examiner

ELECTROMECHANICAL DRIVE DEVICE WITH HOUSING

CROSS-REFERENCE TO RELATED APPLICATIONS

This application claims priority to German Patent Application No. 10 2014 109 322.4, filed on Jul. 3, 2014.

FIELD OF THE INVENTION

The present invention relates to a electromechanical drive device having a housing and a drive device disposed in the housing, wherein the drive device is held circumferentially in the housing in a force fit manner by an opposite side abutment.

BACKGROUND

Such a drive device is referenced above is known from DE 10 2011 082 461. Here, the housing has a cylindrical interior for receiving the stator part, wherein the stator part is fully circumferentially enclosed. The housing has at least one expansion region that is elastically expandable in the circumferential direction of the interior, which expansion region is integrated in one piece into the housing. The cylindrical interior is thus fully circumferentially enclosed. To be mounted in the cylindrical interior, the stator part is inserted axially, wherein the expansion region is elastically widened and elastically shaped back after completion of the mounting, so that the stator part is fixed in the housing in a force-fitting manner. The disadvantage in this drive device is that the axial insertion can be problematic, since in this case the cylindrical interior must simultaneously be widened because the stator part must be exactly positioned with respect to the housing in order to avoid jamming or the like.

The object of the present invention is to improve a generic mechanical drive device such that a cost-effective modular design is provided, and mounting the drive part or an electrical motor in the housing is possible in a simple manner.

SUMMARY

The above described object is inventively attained in that the housing is formed by a base housing part having a bottom section and two mutually opposing lateral wall sections formed on its longitudinal edges, and a housing opening formed on the end side by the lateral wall sections, wherein the housing opening is closed by means of a housing cover, which, in the mounted state, is connected to the lateral wall sections in a force-fitting manner, wherein the force-fitting connection between the drive part and the housing is present due to a bending of the lateral wall sections in the direction of each other.

In this connection, it is advantageous if the base part of the housing is cross-sectionally configured U-shaped with respect to the longitudinal axis thereof, and the lateral wall sections have the same height. Since the force-fitting between the drive part and the housing in the region of the lateral wall sections inventively occurs by mounting the housing cover, the drive part can be axially introduced into the base part of the housing in a simple manner without requiring a definite correct orientation in this case. The final fixation and the force-fitting connection to the lateral wall sections are then realized upon mounting the housing cover. The drive part is expediently configured having a circular cylindrical shape. Furthermore, it is advantageous if the housing cover has locking bars with locking cams on the end sides projecting in the direction of the bottom section, which locking bars lock in a force and form fitting manner in locking grooves formed on the lateral wall sections on their free ends in the mounted state of the housing cover. In this way, a simple and secure connection of the housing cover to the base part of the housing results, wherein the possibility of releasing the housing cover is also readily provided. It is inventively advantageous if, in the unmounted state of the housing cover, the clearance of the lateral wall sections is greater than the clearance after having mounted the housing cover, and greater than the external dimensions, e.g., the diameter of the drive part. Thus, there is a sufficient assembly clearance available between the drive part and the lateral wall sections after the preassembly, as a result of which a problem-free preassembly is possible. Owing to the mounting of the housing cover, this assembly clearance is then compensated by bending the lateral wall sections so that the force-fitting between the lateral wall sections and the drive part is provided.

It is inventively advantageous, if abutment surfaces for the drive part are formed on the lateral wall sections, which abutment surfaces have an inner contour adapted to the outer contour of the drive part, and the abutment surfaces oppose each other in particular diametrically, and have such an arc length that the drive part is enclosed by an enclosing angle greater than 180°. As a result of this, it is possible that after the axial preassembly of the drive part inside the base part of the housing, the drive part is held in the base part of the housing so that an additional fixation of the drive part during the mounting process is not required for mounting the housing cover.

Furthermore, it is advantageous if there is an additional abutment surface for the drive part on the bottom section of base part of the housing. It is inventively furthermore advantageous, if the abutment surfaces are configured on the lateral wall sections and on the bottom section with respect to the drive part, such that the abutment surfaces of the lateral wall sections and of the bottom section have a linear abutment with the drive part seen in the longitudinal direction of the housing in the mounted state of the housing cover. Thus, no full abutment of the drive part on the abutment surfaces is inventively required. In this connection, it can be advantageous if, viewed cross-sectionally with respect to the longitudinal axis of the housing, a four-point abutment between the abutment surfaces of the lateral wall sections is provided consisting of two mutually opposing abutment points on each lateral wall section, or a three-point abutment with each abutment point on the lateral wall sections and one abutment point on the bottom section is provided.

Due to undercuts configured in the region of the lateral wall sections, the thickness of the lateral wall sections is reduced such that an elasticity of the lateral wall sections is established that allows for bending when mounting the housing cover, but simultaneously allows for a springback from the abutment position when releasing the housing cover.

Furthermore, it is inventively advantageous, if, in the region of the free ends of the lateral wall sections, receiving grooves respectively opposing one another are configured on their inner sides extending in the direction of the longitudinal axis of the housing, into which receiving grooves at least one circuit board is inserted. A plurality of such grooves can also be provided one on top of the other. Here, a matching of the receiving grooves and the circuit board is given such that, in the unmounted state of the housing cover, the circuit board can be easily pushed into the receiving grooves, and the circuit board is fixed after mounting the housing cover. At least one semiconductor module is advantageously disposed on the circuit board on its side facing the housing cover, wherein, in the mounted state of the housing cover, it abuts on the semiconductor module with its underside facing the circuit board, such that heat can be transmitted between the semiconductor module and the housing cover, as a result of which an improved cooling effect is achieved. Such a cooling effect can also be improved in that the housing cover and/or the bottom section respectively have cooling ribs on their outer side. Furthermore, it is advantageous if elastic, heat conducting compensation means are disposed on the side of the semiconductor component facing the housing cover. These compensation means allow for tolerance compensation, and also an improved heat transmission from the semiconductor module to the housing cover.

Furthermore, it can be inventively advantageous if the housing is closed by means of an end cover on at least one of its end sides, wherein the housing cover and the end cover are advantageously sealed against the housing with seal elements. In the state of the end cover advantageously disposed on both sides connected to the housing, a mechanically stable housing unit results, which, due to the optionally provided seal elements, is also secured against the penetration of moisture. In this case, it is also within the context of the invention, if components of the inventive drive part are led out in one or in both end covers, wherein it can be, e.g., a drive shaft of a rotor part and/or terminal plugs, wherein these terminal plugs are advantageously attached to circuit boards in the interior of the housing which terminal plugs are disposed perpendicularly to the axially extending circuit board.

The inventive mechatronic drive device can, for example, have an electrical motor as a drive part. Still other electromechanical components, such as, for example, a transmission or the like, can be connected to the drive part. In such a case, it can be expedient if a part of the components connected to the motor is guided outward through the end cover. Depending on the installation length of the drive part, this can also extend partially outward through one of the end covers.

BRIEF DESCRIPTION OF THE DRAWINGS

Advantageous embodiments of the invention are described herein. The invention will be explained in more detail with reference to the attached drawings.

In the various figures of the drawings, identical parts are always provided with the same reference numerals.

DETAILED DESCRIPTION

With regard to the description below, it is claimed that the invention is not limited to the exemplary embodiments and thus not to all or a plurality of features of the described combination of features. Each individual feature of each exemplary embodiment is in fact also the subject matter of the invention even independently of the other individual features described in combination therewith, and also in combination with one or more of the features of another exemplary embodiment.

Figure 1:
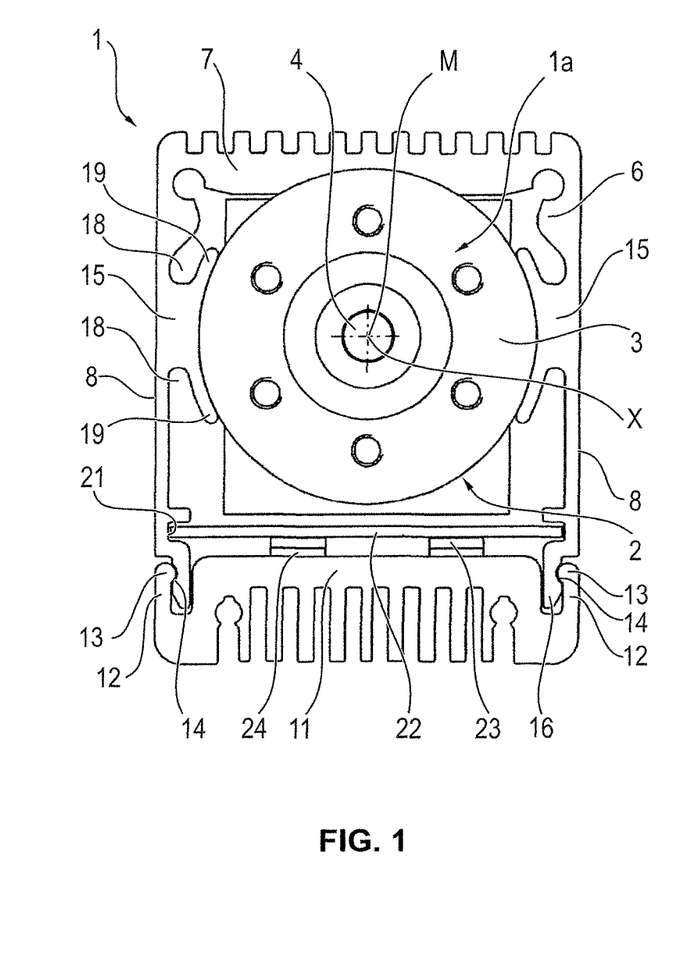
FIG. 1 shows an end view of an inventive electromechanical drive device having a mounted housing cover.

As depicted in FIG. 1, for example, an inventive electromechanical drive device including a housing 1 and an electric drive part 1a, which can be, for example, an electrical motor 2, disposed in the housing 1. This electrical motor 2 includes, for example, a stator part 3 and a rotor part 4 rotatably supported in the stator part 3. The drive part 1a can also be, for example, a linear motor.

The housing 1 preferentially includes a base part of the housing 6 having a bottom section 7 and two mutually opposing lateral wall sections 8 respectively formed on its longitudinal edges. A housing opening 9 is formed by the lateral wall sections 8 on their free ends, wherein the housing opening 9 is closed or can be closed by a housing cover 11.

As depicted in FIG. 1, viewed cross-sectionally with respect to its longitudinal axis X-X of the housing, the base part of the housing 6 advantageously has a profile configured U-shaped, and the lateral wall sections 8 are in particular configured of the same height. It is also inventively possible, if the base part of the housing 6 is configured cross-sectionally with respect to its longitudinal axis X-X as a polygon, in particular as an equilateral polygon.

FIG. 1 shows that the drive part 1a has a circular cylindrical configuration. However, it is also inventively possible, if the drive part 1a is formed on its circumference, for example, as a polygon, in particular as an equilateral polygon, preferentially as a rectangle or a square.

In the mounted state, the housing cover 11 is force and form fittingly connected to the lateral wall sections 8. This means that the housing cover 11 is releasably connected to the base part of the housing 6 and can be mounted in a locking manner on the free ends of the lateral wall sections 8 and in this state sit clamped on the lateral wall sections 8, wherein a form fitting connection is also provided. On its longitudinal edges projecting towards the bottom section 7, the housing cover 11 preferentially has locking bars 12 with locking cams 13 on the end side. In the mounted state of the housing cover 11, the locking cams 13 lock into locking grooves 14 configured on the lateral wall sections 8 on their free ends. The locking grooves 14 preferentially are configured in L-shaped bar shoulders 16 of the lateral wall sections 8, wherein the locking grooves 14 are configured in the longer L-arm of the bar shoulders 16, which extends parallel to the locking bars 12, and the shorter L-arm, which extends perpendicularly to the lateral wall sections 8, has a length that corresponds to the thickness of the locking bars 12, so that the locking bars 12 are flush with the lateral wall sections 8 on their outside.

Figure 2:
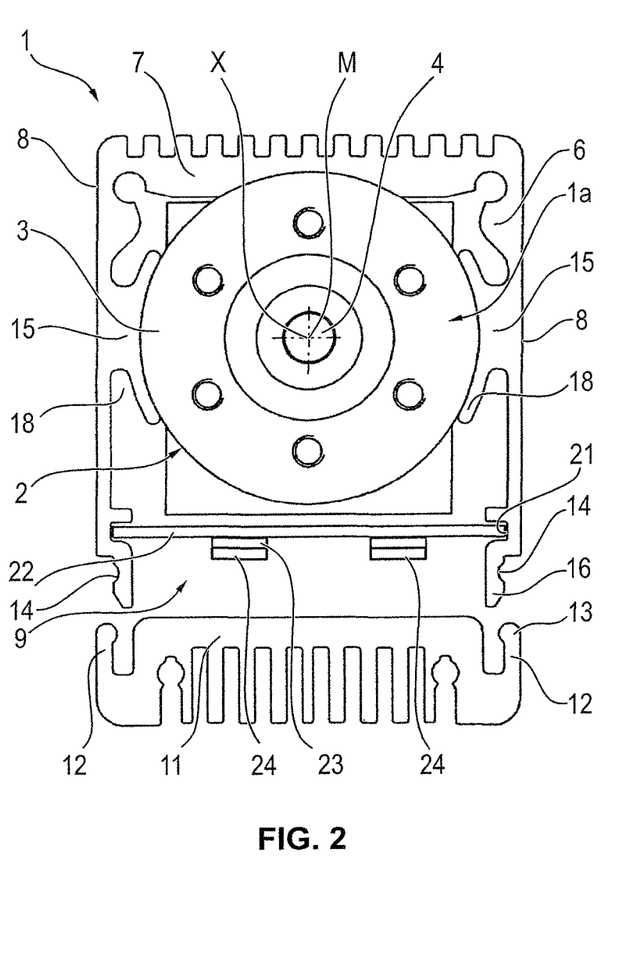
FIG. 2 shows an end view according to FIG. 1, but with an unmounted housing cover.

On their inside the lateral wall sections 8 have abutment surfaces 17 for the drive part 1a, e.g. the stator part 3. These abutment surfaces 17 have, viewed cross-sectionally with respect to the longitudinal axis X-X of the housing 1, an inner contour that is matched to the outer contour of the drive part 1a, e.g., of the stator part 3, such that the drive part 1a, in particular the electrical motor 2, as depicted in FIG. 2, can be inserted in the direction of the longitudinal axis X-X of the housing into the open base part of the housing 6 and in this position be guided between the abutment surfaces 17. The base section 7 also advantageously has a correspondingly configured abutment surface 17. The abutment surfaces 17 on the lateral wall sections 8 are disposed diametrically opposing each other. Here, the abutment surfaces 17 are advantageously configured and disposed such that a perpendicular runs through the midpoint M of the drive device 1a on the abutment surfaces 17, in particular of the rotor part 4 or of the electrical motor 2. Thus, the abutment surfaces 17 enclose the housing volume formed by the drive part 1a, in particular in the depicted example, the cylindrical volume formed by the electrical motor 2 with an enclosing angle greater than 180°, so that the drive part 1a inserted into the open base part of the housing 6 is guided and held within the abutment surfaces 17. The diametric distance of the in particular arcuate abutment surfaces 17 is greater in the unmounted state of the housing cover 11 than an external dimension of the drive part 1a, e.g. the diameter of the circular cylindrical stator part 3. The abutment surfaces 17 of the lateral wall sections 8 are configured such that they expediently have undercuts 18 on their longitudinal edges, so that opposing edge bars 19 are configured. In the shown exemplary embodiment, the lateral wall shoulders 15, including the edge bars 19, have a contour, e.g., an arcuate contour, forming the abutment surface. Viewed in the longitudinal direction X-X of the housing, a linear abutment is expediently formed in the mounted state of the housing cover 11 between the abutment surfaces 17 of the base part of the housing 6 and the stator part 3.

Figure 3:
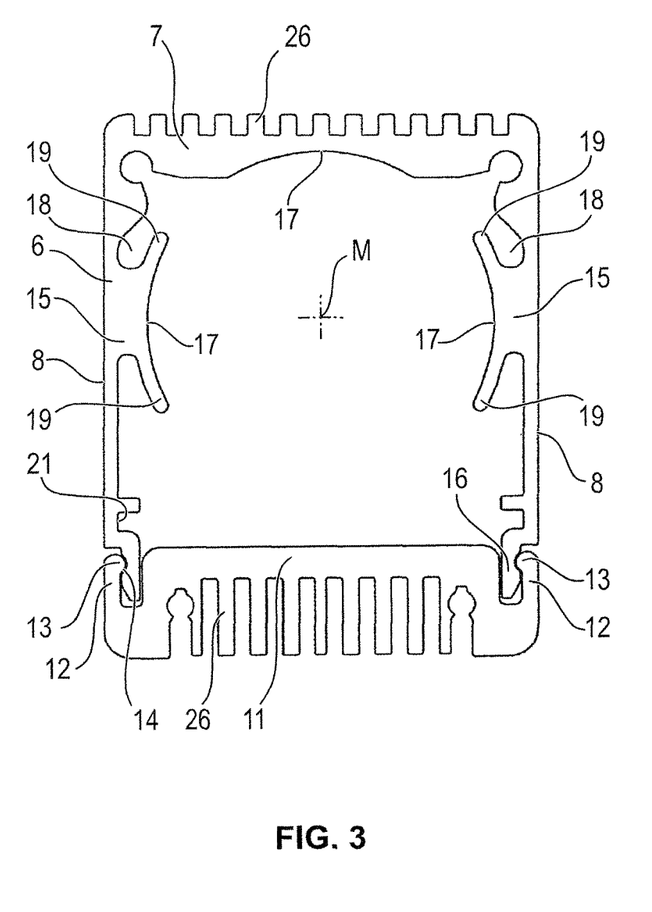
FIG. 3 shows and end view of an inventive housing of the drive device according to FIG. 1, but without the installed drive part, with a mounted housing cover.
Figure 3A:
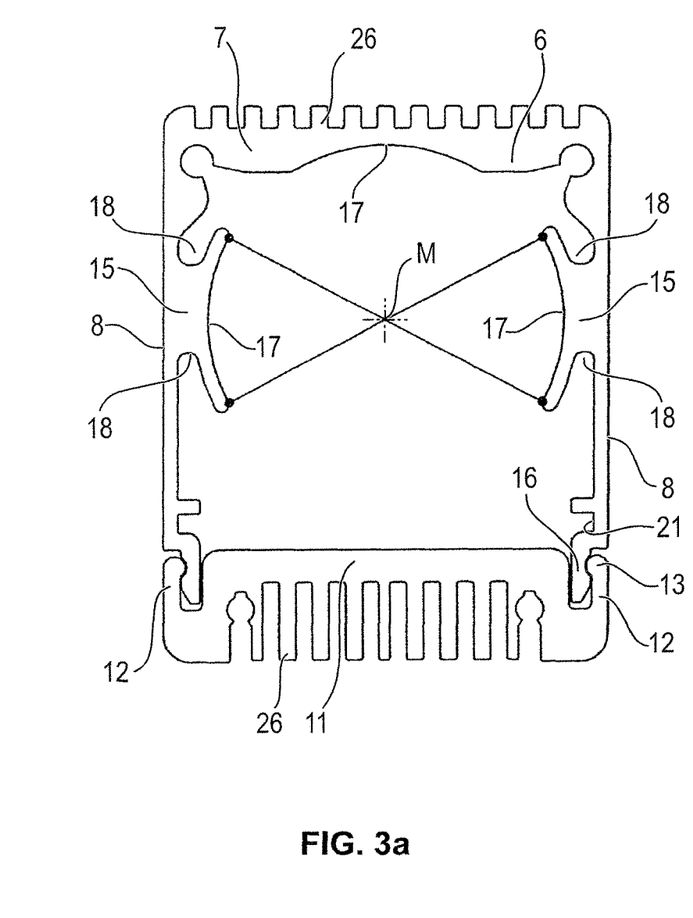
FIG. 3a, 3b show views according to FIG. 3 depicting a four-point or three-point abutment.
Figure 3B:
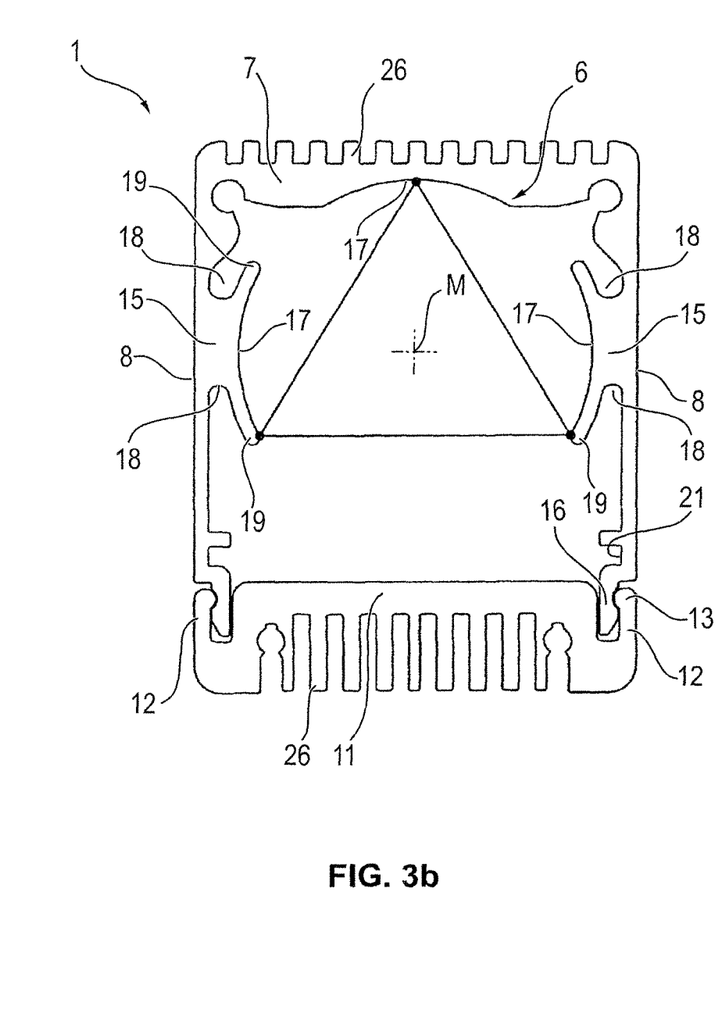

As shown in FIGS. 3a, 3b, i.e. with the mounted housing cover 11, viewed cross-sectionally perpendicularly to the longitudinal axis X-X of the housing, a punctiform abutment results between the drive part 1a and the abutment surfaces 17. According to one embodiment of the invention, see FIG. 3a, a four-point abutment can result, wherein there are respectively two abutment points at each lateral wall section 8 which oppose one another pairwise. Due to the shape of the edge bars 19, the respective abutment points abut directly on the free ends of the edge bars 19, and a centric arrangement of the drive part 1a results.

In FIG. 3b there is a three-point abutment between the drive part 1a and the two lateral wall sections 8 and the bottom section 7. Here, the abutment points abut on the lateral wall sections 8 on the ends of the edge bars 19 facing the housing cover 11, and the abutment point on the bottom section 7 lies centrally thereon. Here, the abutment points in particular form the corners of an equilateral triangle.

Since according to the present invention the clearance of the lateral wall sections 8, in particular in the region of the bar shoulders 16 in the unmounted state of the housing cover 11 is advantageously greater than the clearance after having mounted the housing cover 11 onto the bar shoulders 16, a bending of the lateral wall sections 8 in the direction of each other occurs, since the lateral wall sections 8 are pressed together due to the mounting force when mounting the housing cover 11 and thus the electrical motor 2 is fixed in the housing 1 at the circumference of its stator part 3 in a force-fitting manner via the abutment surfaces 17. Here, the housing cover 11 locks into the locking grooves 14 via the locking cams 13. Furthermore, it can be inventively advantageous, if mutually opposing receiving grooves extending in the longitudinal direction of the longitudinal axis X-X of the housing are respectively configured in the region of the free ends of the lateral wall sections 8 on their insides, into which receiving grooves 21 a circuit board 22 is inserted. This circuit board 22 is expediently introduced into the base part of the housing 6 in the direction of the longitudinal axis X-X of the housing before mounting the housing cover 11 in the longitudinal direction. In this case, the spacing of the receiving grooves 21 in the region of their bottom surfaces is expediently greater than the width of the circuit board 22, if the housing cover 11 has as yet not been mounted. Due to the mounting of the housing cover 11 and the consequently achieved bending of the lateral wall sections 8 in the direction of each other, the spacing of the bottom sections of the receiving grooves is reduced, so that the circuit board 22 is then fixed inside the receiving grooves 21.

Due to the configuration of the undercuts 18 in the region of the shoulders 15, the thickness of the lateral wall sections 8 is reduced and an improved bendability or flexibility of the lateral wall sections 8 is thereby realized. Moreover, the consequently achieved elasticity causes a tolerance compensation for manufacturing tolerances between the base part of the housing 6 and the inserted drive part 1a.

Furthermore, it can be inventively advantageous if at least one semiconductor module 23 is attached to the circuit board 22 on its side facing the housing cover 11, wherein the housing cover 11 expediently abuts on the semiconductor module 23 in the mounted state, such that heat can be transmitted between it and the housing cover 11. In this way, the housing cover 11 also acts as a heat sink for the semiconductor module 23. It can furthermore be expedient, if a compensation coating 24 made of a heat conducting, elastic material is applied to the side of the semiconductor module 23 facing the housing cover 11. This compensation coating 24 can be configured, for example, in the form of a pad or of a paste. This compensation coating 24 serves as tolerance compensation between the housing cover 11 and the semiconductor module 23.

Furthermore, it can be advantageous, if the housing cover 11 and, in particular, also the bottom section 7 has cooling ribs 26 on their outsides. These cooling ribs 26 improve the heat dissipation by the semiconductor module 23 via the housing cover 11, and they also improve the heat dissipation from the drive part 1a, e.g. the stator part 3, to the housing 1 in the region of the bottom section 7. For further improving the heat dissipation, an additional axial fan can be mounted on the housing cover 11, which ensures forced convection along the cooling ribs 26.

Figure 4:
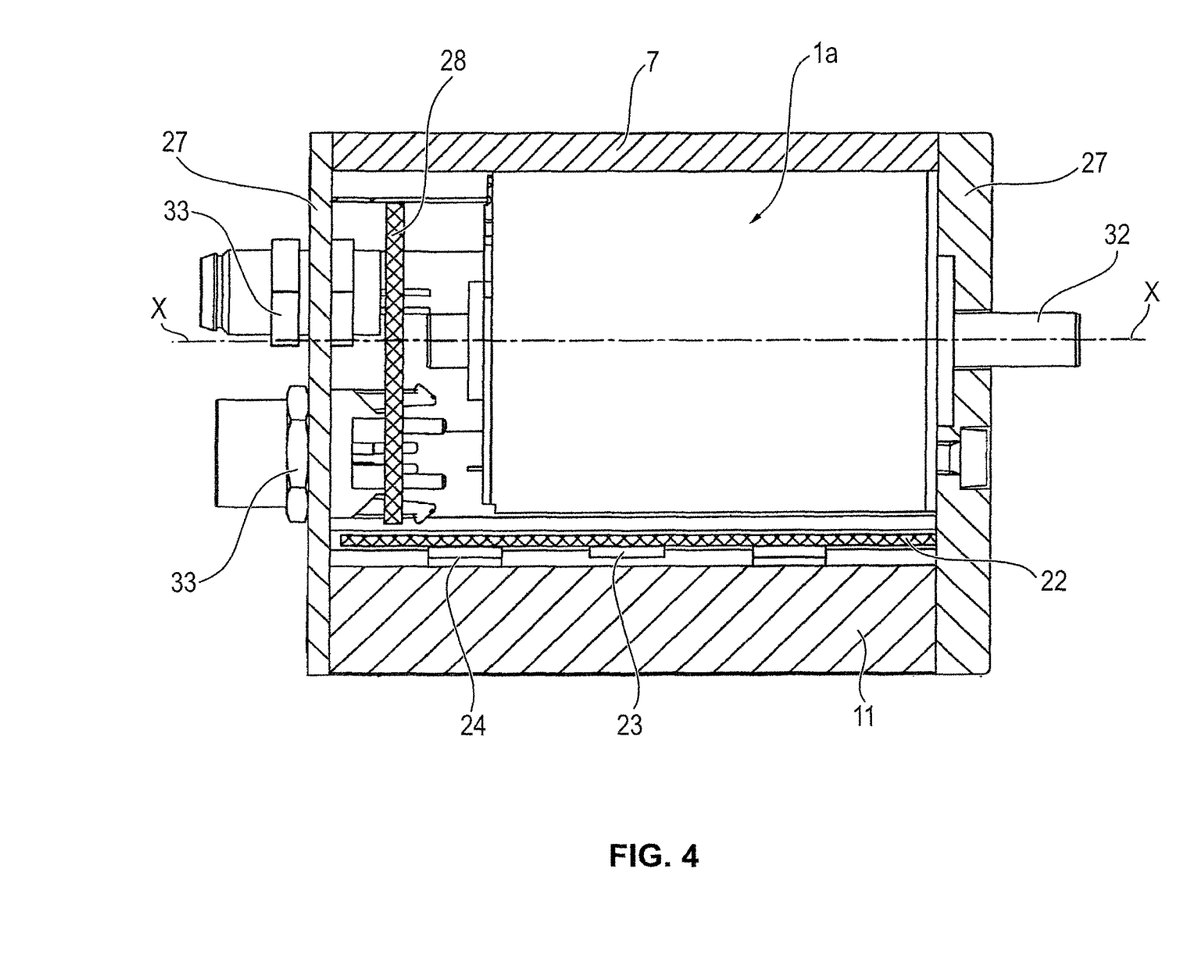
FIG. 4 shows a longitudinal section across an inventive drive device in the assembled state.

For an axial closure of the housing 1, an end cover 27 can expediently be attached to at least one side, preferentially to both end sides of the housing 1. These end covers 27 are attached, for example, by means of screws 31, which are screwed into the base part of the housing 6 and the housing cover 11. A drive shaft 32, for example, of the drive part 1a, e.g. of the rotor part 4, is guided outward through one of the end covers 27, and terminal plugs 33 are expediently guided outward through the respective end cover 27 on the opposite side. These terminal plugs 33 are preferentially attached to circuit boards 28 in the interior of the housing 1, which terminal plugs 33 extend perpendicularly to the circuit board 22.

Figure 6:
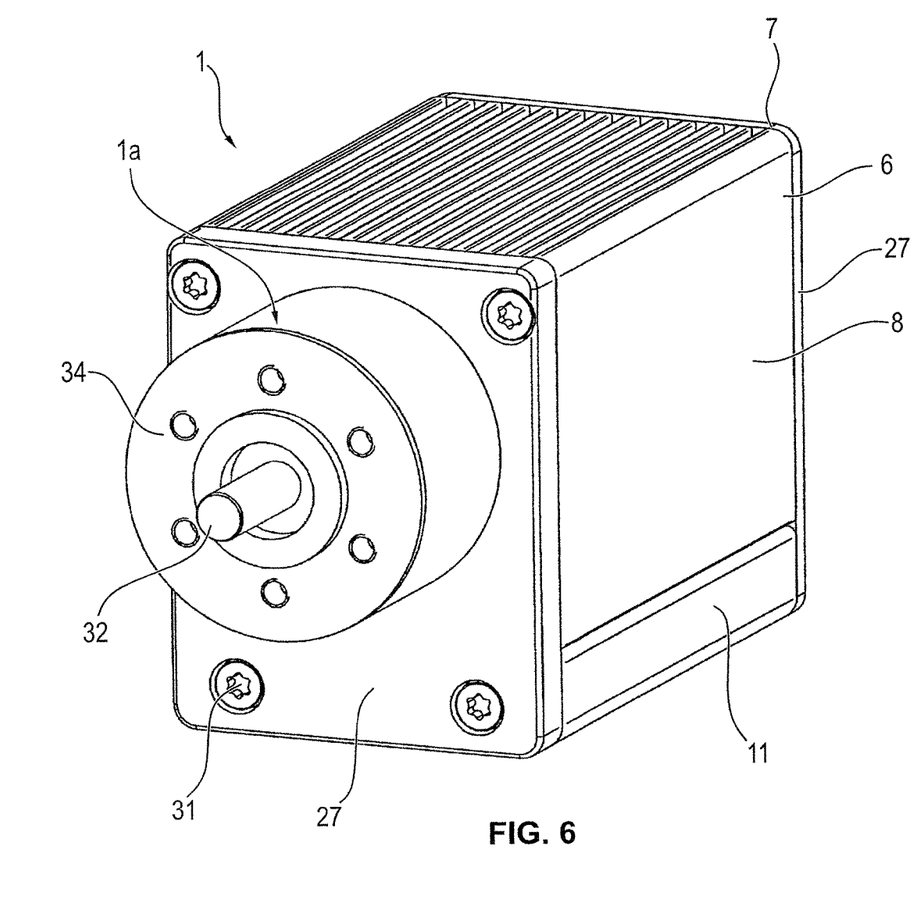
FIG. 6 shows a perspective view of a further embodiment of an inventive drive device.

By screwing the end cover 27 onto the housing 1, on the one hand, the base part of the housing 6 and the housing cover 11 are connected, and, on the other hand, a stable complete housing is formed. If a high IP grade is required, it can furthermore be expedient to provide additional seals, in particular gaskets, between the housing cover 11 and the base part of the housing 6, as well as additional seals between the housing 1 and the end covers 27. Furthermore, it can likewise be inventively advantageous, if the housing 1, for example, not only serves for receiving the drive part 1a, e.g., an electrical motor, but also for receiving a transmission component 34 connected thereto. In this case, it can be expedient if—as shown in FIG. 6—the transmission component is not completely accommodated in the housing, but guided outward through one of the end covers 27. It is also within the context of the invention, if the axial fixation of the electrical motor 2 is provided with additional flanging on one of the end covers 27 for cases of high mechanical loads. Moreover, with a corresponding installation length of the drive part 1a, this can extend outward through an end cover 27.

Figure 5:
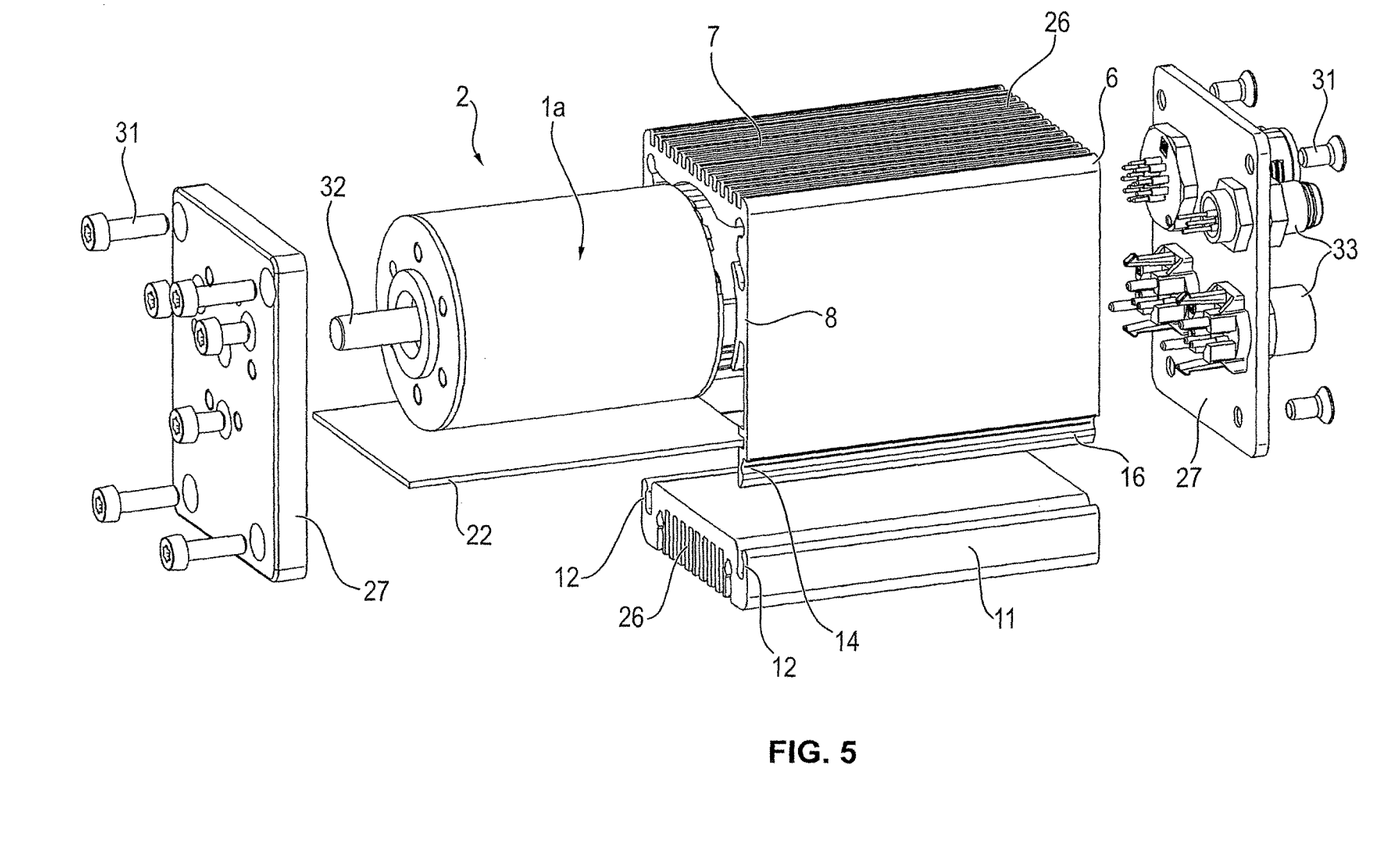
FIG. 5 shows an exploded view of an inventive electromechanical drive device prior to assembly.

As shown in FIG. 5, an inventive electromechanical drive device is mounted such that the drive part 1a, e.g., the motor 2, is inserted axially into the open base part of the housing 6 between the abutment surfaces 17. Then, the circuit board 22 is axially inserted into the receiving grooves 21. After this axial preassembly of the drive part 1a and of the circuit board 22 in the base part of the housing 6, the housing cover 11 is mounted perpendicularly to the longitudinal direction of the housing 1 onto the free ends of the lateral wall sections 8, wherein the housing cover 11 locks into the locking grooves 14 via its locking bars 12. By mounting the housing cover 11 onto the lateral wall sections 8, a bending in the direction of each other of the lateral wall sections 8 occurs, whereby the motor 2 and the circuit board 22 are fixed inside the base part of the housing 6 in a force-fitting manner. Subsequently, the end covers 27 are attached to the end sides of the housing 1 by means of the screws 31, and the housing 1 is thereby completely closed.

While the above description constitutes the preferred embodiment of the present invention, it will be appreciated that the invention is susceptible to modification, variation and change without departing from the proper scope and fair meaning of the accompanying claims.

The invention claimed is:

1. An electromechanical drive device comprising a housing and a drive device disposed in the housing, wherein the drive device is held circumferentially in the housing in a force-fitting manner by mutual abutment,
the housing is formed by a base part of the housing having a bottom section and two mutually opposing lateral wall sections formed on longitudinal edges of the bottom section, and a housing opening formed on an end side by the lateral wall sections,
wherein the lateral wall sections have opposed abutment surfaces for a stator part of the drive part, wherein a distance of the abutment surfaces is greater absent a housing cover at the end side of the lateral wall sections than an external dimension of the drive part,
wherein the housing opening is closed by a housing cover, which in a mounted state is connected to the lateral wall sections in a force and form fitting manner, wherein the force-fitting between the drive device and the housing is present due to the lateral wall sections being bent,
wherein at the end side of the lateral wall sections, a clearance between the lateral wall sections absent the housing cover is greater than the clearance between the lateral wall sections with the housing cover mounted to the lateral wall sections so that, by mounting the housing cover, the lateral wall sections are bent toward each other due to a mounting force pressing the lateral wall sections together and against the stator part, thereby fixing the drive device in the force-fitting manner between the lateral wall sections.

2. The electromechanical drive device according to claim 1, wherein the base part of the housing, viewed cross-sectionally with respect to the longitudinal axis thereof, is configured U-shaped, and the lateral wall sections have the same height.

3. The electromechanical drive device according to claim 1, wherein the drive device has a circular cylindrical configuration, or a polygonal cross-section with respect to the longitudinal axis of the housing.

4. The electromechanical drive device according to claim 1, wherein on longitudinal edges of the housing projecting towards the bottom section, the housing cover has locking bars with locking cams at the ends, which locking bars lock in a force and form fitting manner into locking grooves formed on the lateral wall sections on free ends thereof in the mounted state of the housing cover.

5. The electromechanical drive device according to claim 1, wherein the abutment surfaces have an inner contour matched to an outer contour of the drive part, and the abutment surfaces have an arc length such that the drive device is enclosed by an enclosing angle greater than 180°.

6. The electromechanical drive device according to claim 5, further comprising an additional abutment surface of the drive device part configured on the bottom section.

7. The electromechanical drive device according to claim 5, wherein viewed in the longitudinal direction of the housing, a linear abutment is configured between the abutment surfaces of the lateral wall sections of the housing and the drive part.

8. The electromechanical drive device according to claim 7, wherein viewed cross-sectionally, there is a four-point abutment between the abutment surfaces of the lateral wall sections and the drive device in the mounted state of the housing cover, wherein there respectively are two abutment points on each lateral wall section, wherein a central arrangement of the drive device in the longitudinal axis of the housing is provided.

9. The electromechanical drive device according to claim 7, wherein viewed cross-sectionally, the drive device has a three-point abutment with the lateral-wall sections and the bottom section in the region of the abutment surfaces in the mounted state of the housing cover.

10. The electromechanical drive device according to claim 1, wherein the abutment surfaces of the lateral wall sections are components of lateral wall shoulders, which have undercuts on their longitudinal edges, so that opposing edge bars are formed.

11. The electromechanical drive device according to claim 1, further comprising mutually opposing receiving grooves extending in the direction longitudinal axis of the housing, which are respectively configured in the region of the free ends of the lateral wall sections on their insides, into which receiving grooves a circuit board is inserted.

12. The electromechanical drive device according to claim 11, further comprising semiconductor modules disposed on the circuit board on a side facing the housing cover, and the housing cover abuts on the semiconductor modules with an inner side facing the circuit board such that a heat transfer occurs.

13. The electromechanical drive device according to claim 12, further comprising elastic, heat conducting compensation means disposed on the side of the semiconductor modules facing the housing cover.

14. The electromechanical drive device according to claim 1, wherein at least one of the housing cover or the bottom section has cooling ribs on an outer side.

15. The electromechanical drive device according to claim 1, wherein the housing is closed by an end cover on at least one end.

16. The electromechanical drive device according to claim 15, wherein the housing cover and the end cover are sealed against the housing by one or more seal elements.

17. The electromechanical drive device according to claim 1, further comprising a drive shaft of the drive part, the drive shaft being guided outward through a first of end covers and on the opposite side, terminal plugs are guided outward through a second end cover, wherein these terminal plugs are attached to circuit boards in the interior of the housing.

18. The electromechanical drive device according to claim 17, further comprising a drive component connected to the drive part, wherein the drive component is guided outward with a component section through one of the end covers.

19. The electromechanical drive device according to claim 1, wherein the drive device is guided outward through an end cover.

20. The electromechanical drive device according to claim 1, wherein the drive device is formed by an electrical motor consisting of the stator part and a rotor part rotatably supported therein, wherein the stator part is held circumferentially in the force-fitting manner.

21. The electromechanical drive device according to claim 1, wherein the drive device is configured as a linear motor with a cylindrical stator that includes the stator part, wherein the abutment surfaces are diametrically opposed and the distance is a diametric distance.

* * * * *